United States Patent
Cox

[19]

[11] Patent Number: 5,901,325
[45] Date of Patent: May 4, 1999

[54] EXTENDED ADDRESSING TO MULTIPLE DEVICES ON A SINGLE PARALLEL I/O PORT

[75] Inventor: Darrell L. Cox, Boise, Id.

[73] Assignee: Hewlett-Packard Company, Palo Alto, Calif.

[21] Appl. No.: 08/650,724

[22] Filed: May 20, 1996

[51] Int. Cl.⁶ .................................................. G06F 13/00
[52] U.S. Cl. .......................... 395/821; 395/287; 395/822; 395/183.19; 395/670; 395/281
[58] Field of Search .................................... 395/287, 821, 395/822, 183.19, 670

[56] References Cited

U.S. PATENT DOCUMENTS

| | | | |
|---|---|---|---|
| 4,794,520 | 12/1988 | Kobus, Jr. et al. | 395/287 |
| 5,276,443 | 1/1994 | Gates et al. | 395/822 |
| 5,555,374 | 9/1996 | Armerding et al. | 395/822 |
| 5,555,436 | 9/1996 | Gavish | 395/821 |
| 5,557,741 | 9/1996 | Jones | 395/183.19 |
| 5,619,659 | 4/1997 | Kikinis et al. | 395/281 |
| 5,619,722 | 4/1997 | Lovrenich | 395/822 |

FOREIGN PATENT DOCUMENTS

WO9613769  5/1996  WIPO.

Primary Examiner—Thomas G. Black
Assistant Examiner—Thuy Pardo
Attorney, Agent, or Firm—Anthony J. Baca

[57] ABSTRACT

The present invention, Extended Port Addressing (EPA), is a physical link layer communication protocol for enumeration of more than one device attached to the same parallel port on a desktop personal computer. EPA automatically determines individual devices as they are added or removed from the parallel port. EPA also allows time sharing of device drivers to a particular device without any one device driver locking the logical port. EPA extends plug 'n' play characteristics by determining if other devices share the same parallel port when attached to a T-box EPA device.

16 Claims, 6 Drawing Sheets

… (continued)

EXTENDED ADDRESSING TO MULTIPLE DEVICES ON A SINGLE PARALLEL I/O PORT

TECHNICAL FIELD

This invention is communication protocol between a host computer and one or more peripheral units.

BACKGROUND OF THE INVENTION

Over the past several years, personal desktop computer have made tremendous leaps in capability. However, changing or reconfiguring the hardware usually requires the computer be opened thereby causing some anxiety for the end user. Manufacture of several "add-on" devices, such as scanners, tape machines, CD players, network interfaces have realized that interfacing their product to the computer's parallel port eliminates the need to open the computer. These parallel port add-ons have gained additional functionality with the standardization of a bidirectional parallel port as defined by the IEEE Std 1284-1994 specification entitled IEEE Standard Signaling Method for a Bidirectional Parallel Peripheral Interface for Personal Computers, (Dec. 2, 1994) incorporated herein by reference (herein referred to as IEEE 1284).

Personal desktop computer parallel interface add-ons are becoming more numerous and useful. However, with the present parallel port, the user must keep connecting one and disconnecting another. Some of these add-ons provide a pass-through port connection for connecting a printer. Such a configuration can be seen in FIG. 2. Typically, a second add-on may not be connected to the pass-through port. Such daisy-chain may be possible, however, it may not always work. The parallel port on a personal computer was not designed for daisy-chaining.

An additional problem exists with IEEE 1284 compatible ports. Some printer drivers and their associated status monitors currently lock the parallel port, thereby disallowing any other device access to the port.

SUMMARY OF THE INVENTION

In order to accomplish the present invention, there is provided a method for logically connecting a host computer to more than one device over a parallel port. First, the host computer assigns a unique address to each Extended Port Addressing (EPA) device on the parallel port. Each EPA device monitors the parallel port for the assign address command. As each EPA receives the assign device, if the EPA device has an unassigned address, it disables the logical connection between the host computer and the downstream devices. The EPA device acknowledges to the host computer successful receipt of the assign address command. Now, the EPA device must wait for the host computer to complete the assign address command. Assuming the host completes the command, the EPA device stores the unique address and enables the logical connection between the host computer and the downstream devices.

After all the EPA devices have been assigned unique addresses, the host computer must issue an enable command to the EPA device before the host can communicate with the device. Again, the EPA device monitors the parallel port for the enable command. Upon detecting the enable command, first the EPA device verifies that its unique address is the same as the address in the enable command. Assuming the addresses match, the EPA device disables the logical connection between the host computer and the down-stream devices and acknowledges to the host computer successful receipt of the enable command.

The host computer will send a termination signal when it has finished communicating with the device. Upon sensing the termination signal, the EPA device breaks the logical connection between the host computer and the EPA device and creates a logical connection between the host computer and the downstream devices. The exact termination signal depends on whether the enable command was a "select address" or "lock address."

BRIEF DESCRIPTION OF THE DRAWINGS

A better understanding of the invention may be had from the consideration of the following detailed description taken in conjunction with the accompanying drawings in which.

DETAILED DESCRIPTION OF THE PREFERRED EMBODIMENTS

The present invention is not limited to a specific embodiment illustrated herein. The present invention, Extended Port Addressing (EPA), is a physical link layer communication protocol for enumeration of more than one device attached to the same parallel port on a desktop personal computer. EPA automatically determines individual devices as they are added or removed from the parallel port. EPA also allows time sharing of device drivers to a particular device without any one device driver locking the logical port. EPA extends plug 'n' play characteristics by determining if other devices share the same parallel port when attached to a T-box EPA device.

Figure 1:
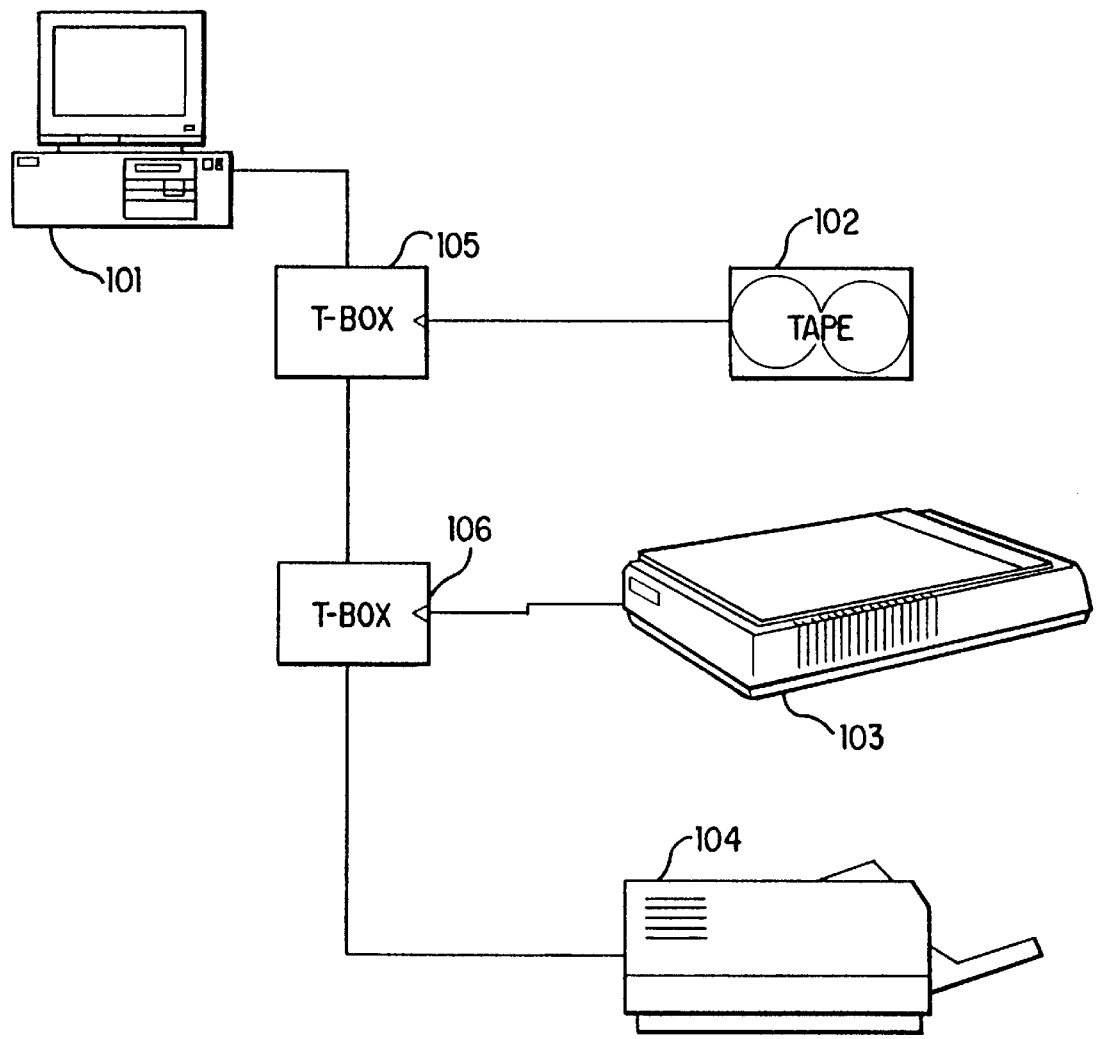
FIG. 1 shows a typical layout using T-boxes in accordance with the present invention.

Referring now to FIG. 1, a typical layout incorporating the present invention is shown. Host computer 101 is connected to tape drive 102, scanner 103, and printer 104 through host's 101 printer parallel port. Each device (tape 102, scanner 103, and printer 104) is designed to independently connect to a standard parallel port on a personal computer. By using T-box 105 and 106, the parallel port of host 101 may be physically connected to all three devices simultaneously.

As shown in FIG. 1, T-box 105 connects host 101 to tape 102 and a second T-box 106. Tape 102 is connected to the Extended Port Address (EPA) port of T-box 105. T-box 106 is connected to the pass-through port of T-box 105. Scanner 103 and printer 104 both connect to T-box 106. Pass-through port of T-box 106 is connected to printer 104. The power up mode of the a T-box is the pass-through mode. Thus, upon power-up, host 101 may communicate with printer 104. Using an EPA command, which are described below, host 101 may communicate with any device on the parallel port.

The arrangement of FIG. 1 uses a standalone (I/O powered) T-box. Any parallel port device can be attached to the T-box (EPA or pass-through side) and the attached device could operate without knowledge of EPA addressing taking place.

EPA addressing and pass-through control are the sole purpose of functionality for the T-box. Thus, for example, host 101 negotiates with T-box 105 to open an EPA address. Once the EPA address is accepted, T-box turns off the down stream I/O activity and turns on the EPA port. Host 101 may then negotiate to ECP or any other IEEE 1284 mode with tape 102. When host 101 finishes its task with tape 102, the EPA connection is terminated and T-box 105 is placed in pass-through mode.

The down stream device (printer 104 in FIG. 1) is activated while both T-boxes (105 and 106) are in pass-through mode. Therefore, no EPA negotiation is required to communicate with the down stream device. The down stream device can be IEEE 1284 compatible, which means Compatibility Mode or any other IEEE 1284 mode can be used to communicate with this device, preserving backward compatibility for present Plug 'n' Play products. However, if the down stream device has EPA capability, then it to can be addressed according to EPA protocol, thus creating a daisy chain of devices, as shown in FIG. 2.

By using EPA, it is possible for a T-box to take control (i.e., become a master) of the parallel bus thereby allowing an "up-stream" device to talk to a "down-stream" device. For, example, T-box 106 in FIG. 1 may take control of the parallel bus allowing scanner 103 to talk directly to printer 104. Such an arrangement could allow for a user to make copies from scanner 103 to printer 104 with out requiring host 101 activity. Of course, T-box 105 could allow tape 102 to communicate to either scanner 103 or printer 104.

Figure 2:
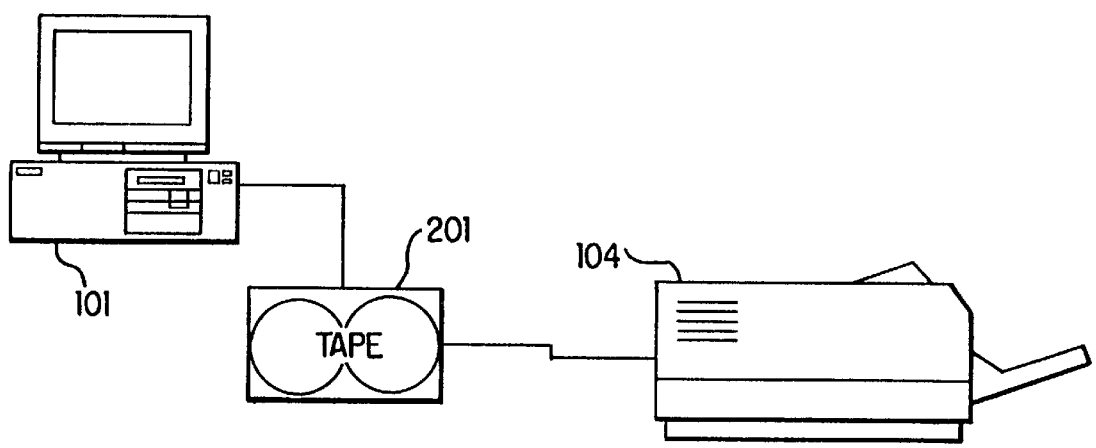
FIG. 2 shows a typical layout using EPA compatible devices.

The arrangement in FIG. 2 is very similar to a standalone T-box, here tape drive 201 incorporates EPA capability. Tape 201 must be an IEEE 1284 compliant device, supporting one or more of the extended modes, i.e., ECP, and/or EPP etc. Tape drive 201 also provides a down stream I/O connection for any device with or without EPA capability. Obviously, if the down stream device has EPA capability, then it to can be addressed according to EPA protocol, thus creating a daisy chain of devices. Additionally, tape drive 201 may take control of the down-stream parallel bus.

EPA addressing is a subset of functionality for the Integrated T-box in tape drive 201. The EPA compliant tape drive provides EPA control and is locally powered. Host 101 negotiates with the Integrated T-box of tape 201 to open an EPA address, once the EPA address is accepted, the Integrated T-box of tape 201 turns off the down stream I/O activity and turns on the EPA port. Host 101 can now negotiate to ECP or some other IEEE 1284 mode with tape 201.

Under the preferred embodiment of the present invention the four basic commands: "Assign Address" (AA), "Select Address" (SA), "Lock Address"(LA) and "Un-Address" (UA) implement EPA. The new EPA Commands are shown in Tables 1 and 2. Table 1 indicates how the new EPA command fits into the existing IEEE 1284 Extensibility Table. Each EPA command must follow the template (1 [EPA] ####) shown in Table 1. One skilled in the art will also see that to avoid confusion with the request Extensibility Link, an EPA command of 1000 0000 is not allowed. Table 2 details each EPA Extensibility Command. By way of an example, an EPA command of 1100 0011 sends a "Select Address" command to the EPA device with address 3. Each command and any potential sub commands will now be described in detail. It should be noted that and EPA device that is not T-Box, such as Tape 201 in FIG. 2 may exclude implementation of either SA or LA but not both.

Before host 101 can select the EPA port of a given T-box (or EPA compatible device), each T-box must be assigned an address. Addressing is accomplished by sending an Assign Address (1[110] XXXX) command with an appropriate address. The most upstream un-addressed EPA device on the I/O port will take the EPA address being sent as part of the EPA negotiation.

Assign Address provides the service of assigning an EPA address to a device, but it also provides for address partitioning. Address partitioning allows the separation or determination of existing daisy chain devices, with series resistance elements on data lines, from other daisy chain devices that do not have series resistance elements on the data lines. These series resistance devices are referred to as Restricted Address (RA) devices. An RA devices has series resistance devices (i.e., bi-directional FET switches) to turn off the data line drivers from the host so that an EPA device can take over the drive of the downstream data lines. Therefore, RA devices restrict the number of devices that can be daisy chained because the resistance elements reduce data integrity. More than 4 series resistance devices daisy chained together will severely disturb data integrity, excluding cables longer than 2 meters and assuming each element does not exceed 7 ohms. So for longer cables there should be fewer of these RA devices daisy chained together.

Any device that puts a series resistance element on the data lines must only answer (XFLAG - TRUE) to AA commands with the 4 upper addresses in the field, called the Restricted Addresses (1 [110] 11XX). With RA control the host can determine how many RA devices are on the line and can control or suggest to the user to remove or rearrange them if data integrity becomes a problem.

The next step for Host 101 is to look for additional EPA devices on the I/O. At this time a new unique EPA address is sent down and the already addressed devices compare addresses and determine a non-match and allow the new address to continue on to other downstream devices. It is a protocol violation to repeat an Assign Address command with the same address. The response to this command must be XFLAG=Low and disallow any downstream conveyance of the command. Host 101 builds a device table with established EPA addresses and associates each address with Device ID information.

Using the configuration of FIG. 1 for exemplary purposes, after power-up, both T-boxes 105 and 106 are in pass-through mode and neither has an assigned address. Host 101 sends an Assign Address (AA) to which both T-boxes try to respond. If T-box 106 responds before T-box 105 then T-box could be assigned the first EPA. However, host 101 has a predefined time delay to allow the slower devices to respond. Therefore, even though T-box 106 was the first to respond, before the time delay has expired T-box 105 will respond. As T-box 105 responds to an assign address, it also disconnects all down stream devices. Thus, while T-box 106 initially responded to the assign address, its connection with host 101 is broken when T-box 105 responds. Without an acknowledge from host 101, T-box 106 does not finish the assign address task.

After host 101 has assigned an address to T-box 105, another assign address is sent. Upon seeing the assign address T-box 106 again responds. This time however, T-box 105 does not respond because it has already been assigned an address. After T-box 106 has been assigned an address, host 101 sends another assign address command. After the time delay has expired, host determines that no other un-addressed EPA devices are present.

Numerous number systems could be used to indicate the various EPA nodes. In the preferred embodiment, each EPA device is number in an hierarchy fashion. T-box 105 has a logically address of 1.1 where the first 1 indicates that it is connected to the first parallel port of host 101. The second 1 indicates that it is the first EPA device on the parallel port. In a similar manor, T-box 106 has an address of 1.2.

Now that the addresses have been assigned, host 101 must select an address before it may access a device on an EPA port of a T-box. The Select Address (1[100] XXXX) command is used to access an EPA addressed device. This command must be issued before any standard IEEE 1284 negotiation requests can be accepted by the EPA compliant device, with the exception of EPP (Extended Parallel Port) mode. In the preferred embodiment, termination from a EPA addressed state, using Select Address, requires the dropping of the Active1284 (nSelectIn) signal line and then completing a Termination protocol or timing out. Termination deselects all sub-selected devices as well.

The Lock Address (1 [010] XXXX) command, which is similar to the SA command, is used to access an EPA addressed device. However, the lock address command uses the nInit signal line to indicate termination. Because EPP uses the nSelectIn signal, the SA command would be prematurely terminated during an EPP connection. Therefore, the LA command should be used for those connections that use EPP. To terminate from EPP, the device must send a true nInit signal for a period less than about 20 usecs. Termination deselects all subselected devices as well.

Finally, the Un-Address (1 [111] 0000) command removes the addressed state of all EPA devices. By removing all addressed devices and then reestablishing their addresses allows for "hot swapping" of the I/O system. Without the UA command, if a device was addressed then removed without knowledge of the system, the system would be left confused. Because EPA is a point to point protocol, to Un-Address all devices on the port, UA command must be issued until a XFLAG(Select)=Logic Low response during negotiation is detected.

Figure 6:
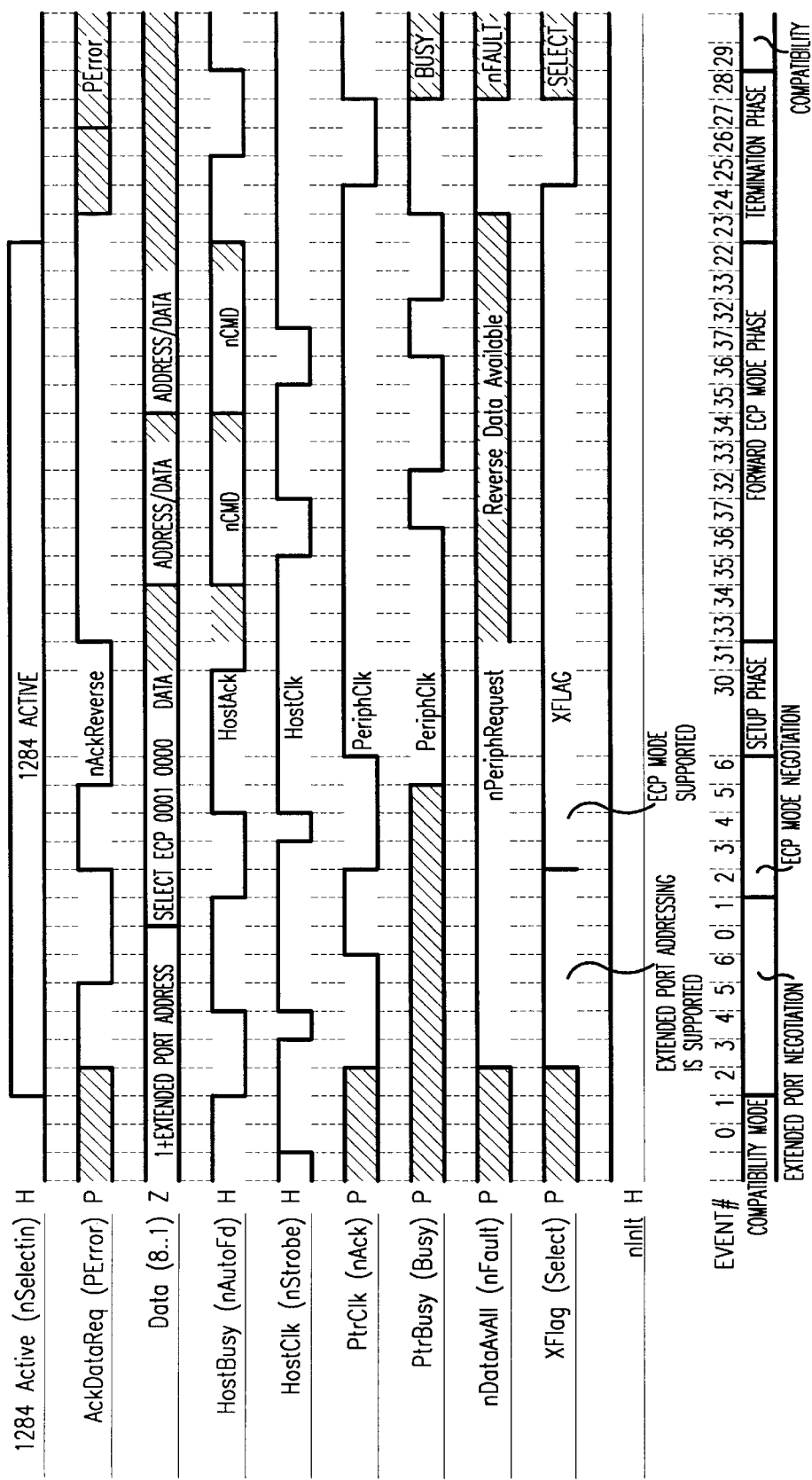
FIG. 6 is a timing diagram showing the events of the EPA negations process.

Referring now to FIG. 6 the negotiation process for EPA, events 0–6, will be described in detail. As stated above, upon power-up, all daisy chain devices are in Pass-Through Mode looking for EPA Commands to occur. When the EPA Command is presented on the port, all daisy chained devices try to act on the command. There will be fast acting and slow acting devices trying to determine if the command is intended for their respected device. Therefore, it is important for host 101 to wait for all the daisy chain activity to settle, primarily during the downstream disabling process, before proceeding. This delay occurs between event 1 and event 2, the time is specified later in this document. (Event definitions are described in timing diagrams from the IEEE 1284 Standard as well as later in this document).

The EPA device must not accept an EPA command until event 3. The process can now normally continue to event 4, 5, and 6. Without dropping 1284Active (nSelectIn), host 101 requests another 1284 mode, such as ECP, which offers bidirectional I/O communication without terminating between forward and reverse directions. In the preferred embodiment, the EPA connection remains established until a Termination has occurred (i.e., the 1284 Active signal is lowered, and on to events 22–28). Therefore, if the ECP connection is terminated, this too terminates the EPA connection.

With that high level overview of the EPA, each event in FIG. 6 will now be described in more detail. The Host 101 starts at event 0 and allows the proper time (0.5 microseconds) for the EPA command setup on the data lines.

Once host 101 enters event 1, it must give ample time so the daisy chain devices can detect the EPA command and settle out the downstream detection and pass-through disable process. The preferred embodiment time delay is a minimum of 5 milliseconds. Presently the IEEE 1284 Standard specifies 0 seconds minimum, therefore this is a departure from the specification, however, the maximum time between event 1 and event 2 is 35 milliseconds, thus this is well within the maximum.

The result of transitioning to Event 2 depends on the present state of the EPA device and the EPA command presented on the data bus. The following if-then cases describes the result given the present state and the received command:

If the command is a EPA Un-Address command and the respective device is already unaddressed, then the EPA device stays in pass-through mode and does not try to handshake any further.

If the command is a EPA Un-Address command and the respective device is not unaddressed, then the EPA device disables downstream devices and continues with the handshake.

If the command is a EPA Assign Address command and the respective EPA device is not addressed, then the EPA device disables downstream devices and continues with the handshake.

If the command is a EPA Assign Address command and the respective device is already addressed, then the EPA device checks to see if the address is the same as the respective device, if so, then the EPA device disables downstream devices, the handshake continues preparing to return a negative response to XFLAG during event 5 because this is a protocol violation; else if the address is not the same, then the EPA device stays in pass-through mode and does not handshake any further.

If the command is a EPA Select Address command and the respective device is already addressed, then the EPA device checks to see if the address is the same as the respective device, if not the same, then the EPA device stays in pass-through mode and does not handshake any further; else if the address is the same, then the EPA device disables downstream devices and continues with the handshake.

If the command is a EPA Lock Address command and the respective device is already addressed, then the EPA device checks to see if the address is the same as the respective device, if not the same, then the EPA device stays in pass-through mode and does not handshake any further; else if the address is the same, then the EPA device disables downstream devices and continues with the handshake.

When the EPA device has determined the command is valid, the command is accepted and the handshake continues to event 2. The EPA device immediately disables downstream control and status lines. Host 101 now waits a minimum of 5 milliseconds for the downstream daisy chained control lines to settle out before accepting event 2.

Host 101 can transition to event 3, with TH timing as soon as determining event 2 is valid. The EPA device must recognize event 3 before accepting the EPA command. If TH timing expires waiting for event 3, then the EPA device declares a protocol violation and returns to pass-through. The EPA command will be ignored on this occurrence.

Host 101 can transition to event 4 once the EPA device has detected a valid logic low HostClk(nStrobe) and whether or not the EPA command was accepted by the EPA device.

Therefore, the EPA device monitors HostBusy(nAutofd) and HostClk(nStrobe) and waits for both to return to logic high then transition to event 4.

As the EPA device transitions to event 5 it sets or clears XFLAG(Select) to indicate whether or not the command was accepted or valid in accordance with if-then cases satisfied during transition from event 1 to event 2. Event 6 completes the negotiation process, at this time the host may chose one of the following cases:

If the completed EPA command was an Un-Address command, then the host transitions to the Termination events 22–28, this also ends the EPA active mode.

If the completed EPA command was an Assign Address command, then the host transitions to the Termination events 22–28, this also ends the EPA active mode.

If the completed EPA command was a Select Address command, then the host may start another IEEE 1284 negotiation such as; requesting ECP mode—event 0–6, then on to event 30. As long as another IEEE 1284 mode is active, an EPA connection is maintained. When ECP mode is Terminated, events 22–28, the EPA connection is terminated.

If the completed EPA command was a Select Address command, then the host may start another EPA negotiation, all EPA commands can be accepted in this nested or sub linked situation. When any termination occurs–events 22–28, the first EPA connection and any sub linked EPA connections are also terminated. A nested network of EPA devices is shown in FIG. 3, which is explained in more detail below.

If the completed EPA command was a Lock Address command, then the host may start another IEEE 1284 negotiation such as; requesting EPP mode—event 0–6, then on to event 30. As long as another IEEE 1284 mode is active, an EPP connection is maintained. When EPP mode is terminated the EPA connection is terminated.

If the completed EPA command was a Lock Address command, then the host may start another EPA negotiation, all EPA commands can be accepted in this nested or sub linked situation. When a termination occurs, the first EPA connection and any sub linked EPA connections are also terminated.

Figure 3:
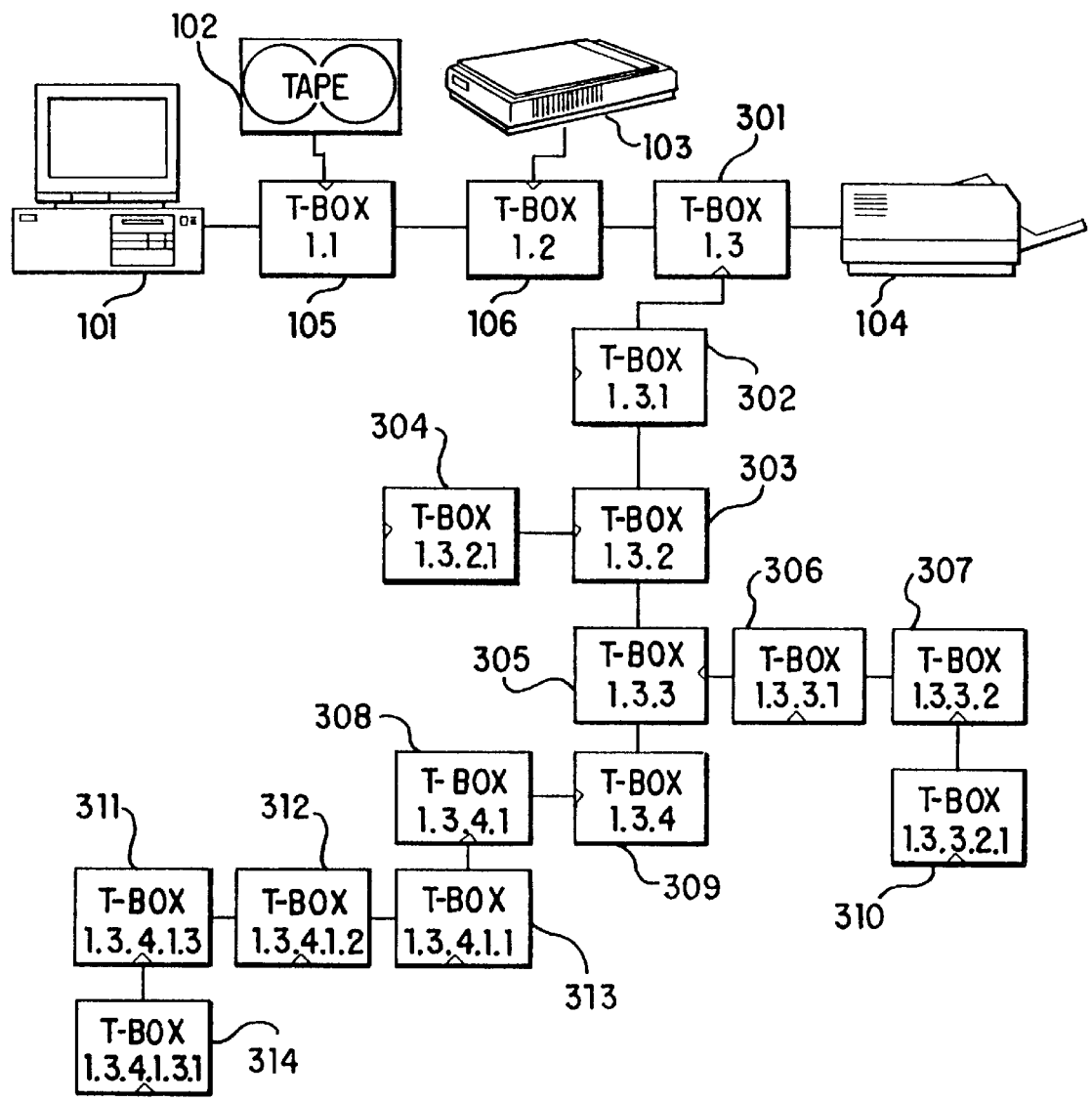
FIG. 3 shows a layout that includes nested networks.

Referring now to FIG. 3, a nested or sub-linked network is shown. In FIG. 3, the configuration of FIG. 1 has been expanded to include a nested network. One skilled in the art will understand that the network shown in FIG. 3 is for exemplary purposes only. As host 101 assigns addresses to each EPA device, it determines that T-box 301 has a nested network attached to it. During the assign address process, T-box 105 is assigned the address 1.1 as described above. Similarly, T-box 106 is assigned the address of 1.2. The third T-box 301 is assigned the address 1.3. Printer 104 is connected to the pass-through port of T-box 301. EPA port of T-box 301 is connected to T-box 302. The EPA port of T-box 302 is connected to an I/O device not shown in FIG. 3.

After host 101 has assigned an address to T-box 301, host 101 must select the EPA port of T-box 301. Subsequent assign address commands result in assigning an address 1.3.1 to T-box 302. Address 1.3.1 indicates that the T-box 302 is connected to port one of host 101 off of the third T-box (301) and is the first device on this sub-link. T-boxes 303, 305, and 309 are subsequently assigned the following addresses: 1.3.2, 1.3.3, 1.3.4 respectively. Each T-box (302–309) is connected together through their pass-through port, in particular, T-box 303 is connected to the pass-through port of T-box 302.

T-box 304 is connected to the EPA port of T-box 303. T-box 304 is assigned the 1.3.2 address. Similarly, T-box 306 is connected to T-box 305 EPA port. T-boxes 306 and 307 are assigned the 1.3.3.1 and 1.3.3.2 addresses respectively. T-box 310, which is connected to the EPA port of T-box 307, has an address of 1.3.3.2.1. T-box 309 has a sub-link connected to it. The EPA port of T-box 309 is connected to T-box 308. T-box 313 is connected to the EPA port of T-box 308. T-box 311 is connected to the pass-through port of T-box 312, which is connected to the pass-through port of T-box 313. Finally, T-box 314 is connected to the EPA port of T-box 311. The network of FIG. 3 can support a total of 16 I/O devices.

Each T-box is assigned a unique address indicating its location within the network. Those addresses are shown in FIG. 3. By using this operation, assuming there are no RA devices present, the network may be extended without limit. As discussed above an RA device has a limit to the number of devices that can be added after the RA.

Additionally, it should be noted that LA and SA can not be mixed within a network. For example, if Host 101 wish to "Lock Address" to the device connected to T-Box 302 then Host 101 must first issue a LA command to address 1.3 (i.e., T-Box 301) thereby activating the EPA port of T-Box 301. Next, Host 101 issues a LA to address 1.3.1, which activates the EPA port of T-box 302. Once a sub-net has been selected by a LA, a SA command is a protocol violation. Similarly, if Host 101 wish to "Select Address" to the device connected to T-Box 302 then Host 101 must first issue a SA command to address 1.3 to activate the EPA port of T-Box 301. Next, Host 103 issues a SA to address 1.3.1, which activates the EPA port of T-box 302. Once a sub-net has been selected by a SA, a LA command is a protocol violation. Thus, only like command can be used to access any sub-net.

Figure 4:
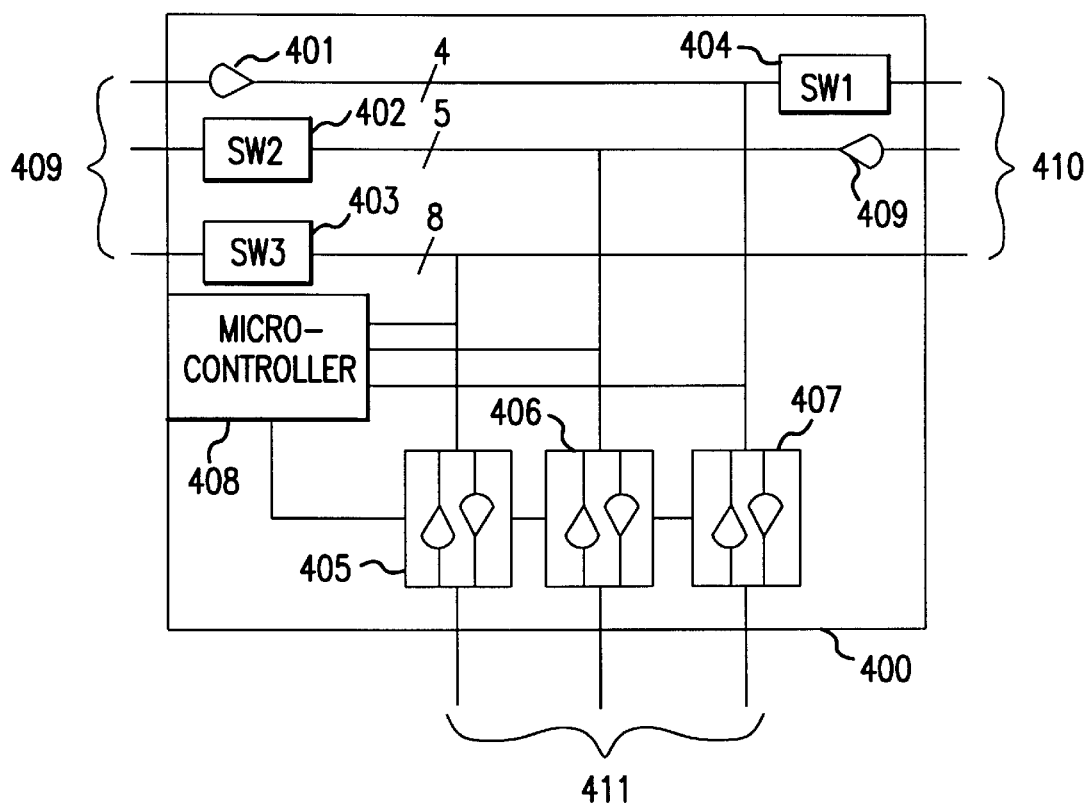
FIG. 4 is a block diagram of a T-box device.

Referring now to FIG. 4, where an exemplary block diagram of a T-box 400 is shown. In the pass-through mode, port 409 is connected to port 410. Similarly, in EPA mode port 409 is connected to port 411. Finally, in master mode, port 411 in connected to port 410. In pass-through mode, buffers 405, 406, and 407 are disabled and switches 404, 402, 403, are enabled, thereby connecting port 409 to port 410.

Microcontroller 408 monitors information on the incoming port 409 and response to any EPA command. For example, assuming the host wishes to "select address" of T-box 400. Host manipulates control lines, which pass through buffer 401, and 407. The EPA command is presented on the data lines through switch 403 and buffer 405. Upon seeing the proper EPA command, microcontroller 408 performs the above described negotiation process with the host. After microcontroller 408 successfully completes the negotiation for "Select Address, microcontroller 408 disables switch 404 and buffer 409 is also tri-stated. Simultaneously, buffers 405, 406, and 407 are enabled thereby connecting port 409 to port 411. Remembering that the present example uses the "select address" command, microcontroller 408 monitors the 1284 active(nSelectIn) line for an indication to terminate EPA mode. Termination by T-box 400 reconnects port 409 to port 410 by enabling buffer 409, along with switches 404, 402, and 403, buffers 405, 406 and 407 are disabled.

If Microcontroller 408 need to enter master mode, it must negotiate with the host for control of the bus. After microcontroller 408 successfully completes the negotiation it disables switches 402 and 403 and buffer 401 is tri-stated.

Simultaneously, buffers 405, 406, and 407 are enabled thereby connecting port 410 to port 411. Termination by T-box 400 reconnects port 409 to port 410 by enabling buffer 401, along with switches 402 and 403, buffers 405, 406 and 407 are disabled.

Figure 5:
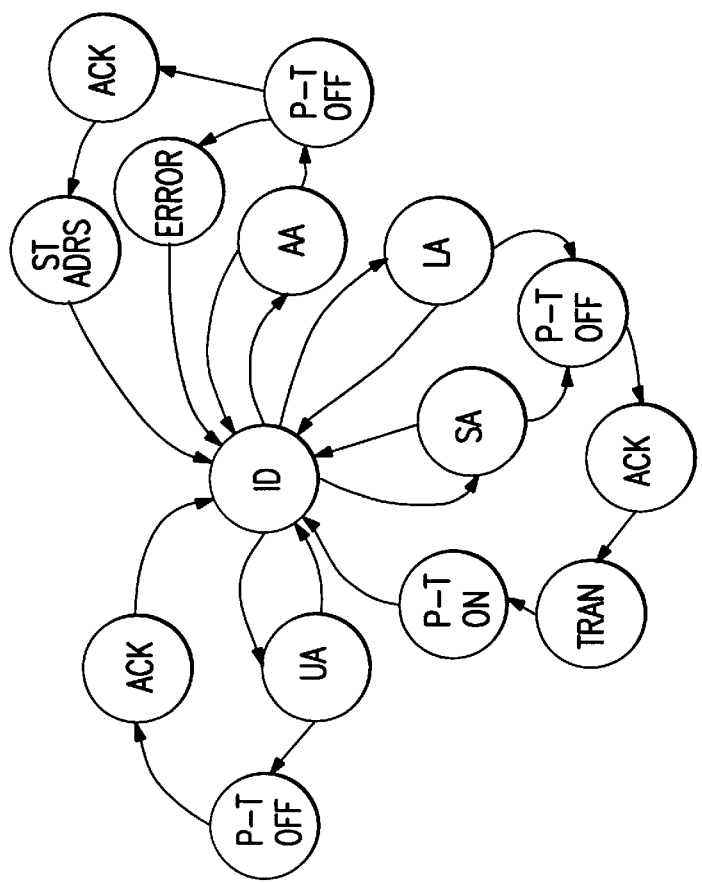
FIG. 5 is a state diagram for the T-Box device.

Referring now to FIG. 5 where a state diagram for microcontroller 408 of FIG. 4 is shown. Microcontroller 408 waits in an idle state (ID) looking for an EPA command on the data lines. As described above, the EPA device may receive four basic commands: "Assign Address" (AA), "Select Address" (SA), "Lock Address" (LA) and "Un-Address" (UA). Microprocessor 408 transitions to the AA state upon receiving an AA command. If the EPA device is already assigned an address and the address in the present AA command is different, microcontroller 408 returns to the ID state. If the assigned address and the present AA command address are the same, microcontroller 408 transitions to the P-T OFF state. Here, microcontroller 408 turns off the pass-through port, then enters the ERROR state. After microcontroller 408 has acknowledged the error it returns to the ID state. If the EPA device is unassigned, microcontroller 408 transitions to the P-T OFF where it turns off the pass-through port. The AA command is acknowledged in the ACK state. Finally, the EPA's address is stored by microcontroller 408 during the ST ADRS state.

Microcontroller 408 transitions to the UA state after receiving an Un-Address command. If the EPA device is already un-addressed, then microcontroller 408 returns to the ID state. In the alternative where the EPA is not unaddressed, microcontroller 408 disables downstream devices in the P-T OFF state and acknowledges the un-address command during the ACK state.

If the command is a EPA Select Address or Lock Address command, microcontroller 408 enters the SA or LA state respectively. If the EPA device is already addressed, microcontroller 408 checks to see if the address in the present command is the same as the EPA device. If the addresses are not the same, microcontroller 408 returns to the ID state. In the alternative where the addresses is the same, the EPA device disables downstream devices (P-T OFF state) and acknowledges the EPA command (ACK state). Next microcontroller 408 enter the TRAN state while data is transferred through the device. Once microcontroller 408 receives the correct indication to terminate the connection, the pass-through port is re-connected in the P-T ON state and microcontroller 408 returns to the ID state.

One skilled in the art will understand that while T-box 400 of FIG. 4 is described as using a microcontroller, the state diagram in FIG. 4 is simple enough that microcontroller 408 may be replaced with a state machine.

Figure 7:
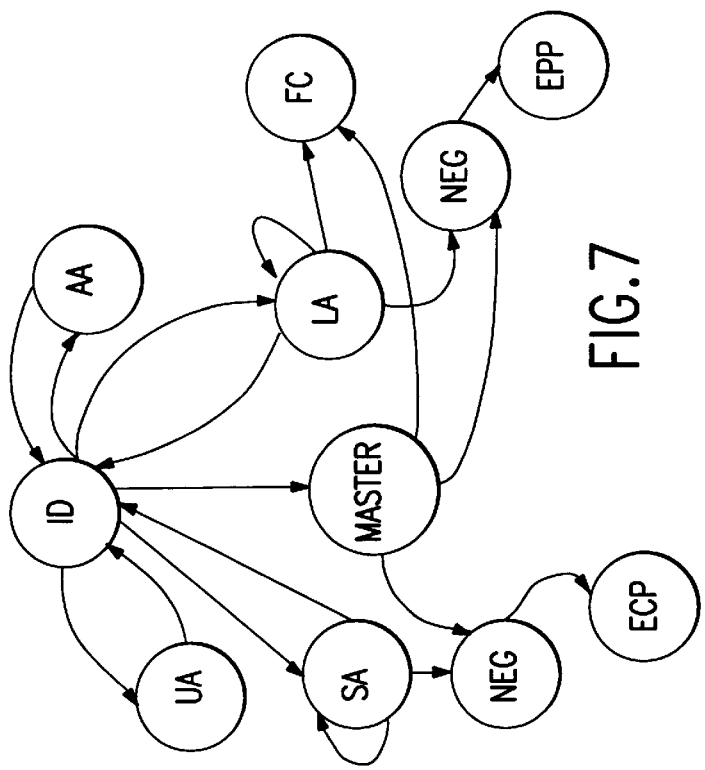
FIG. 7 is a state diagram for the host.

In FIG. 7 an simplified state diagram for the host is shown. After host 101 enters the SA state it may negotiate (NEG) for an ECP connection or return to ID and send another EPA command (excluding an LA command). From the LA state host 101 may negotiate for an EPP connection or send another EPA command (excluding an SA command.) Additionally, from the LA state, host 101 may enter a restricted Forward Compatibility (FC state), which allows for centronics type communication with a device on the EPA port of the T-box. Forward Compatibility mode allows the centronics device to use the nInit signal to indicate a flush buffer command. The present invention terminates a LA connection when nInit is asserted. Therefore, to remain in the FC state, nInit can only be used for termination of the EPA connection.

Although the preferred embodiment of the invention has been illustrated, and that form described, it is readily apparent to those skilled in the art that various modifications may be made therein without departing from the spirit of the invention or from the scope of the appended claims.

TABLE 1

| Key Bit | Definition | Valid Bit Values (7654 3210) | Xflag Affirmative Response |
|---|---|---|---|
| 7 | EPA Extension Commands | 1[EPA] #### | High |
| 7 | Request Extensibility Link | 1000 0000 | High |
| 6 | Request EPP Mode | 0100 0000 | High |
| 5 | Request ECP Mode with RLE | 0011 0000 | High |
| 4 | Request ECP Mode | 0001 0000 | High |
| 3 | Reserved | 0000 1000 | High |
| 2 | Request Device Id; Return Data Using Nibble Mode Reverse Channel Transfer | 0000 0100 | High |
|  | Byte Mode Reverse Channel Transfer | 0000 0101 | High |
|  | ECP Mode Transfer Without RLE | 0001 0100 | High |
|  | ECP Mode Transfer With RLE | 0011 0100 | High |
| 1 | Reserved | 0000 0010 | High |
| 0 | Byte Mode Reverse Channel Transfer | 0000 0001 | High |
| none | Nibble Mode Reverse Channel Transfer | 0000 0000 | Low |

TABLE 2

| EPA Command Definition | Valid Bit Values (7654 3210) | Xflag Affirmative Response |
|---|---|---|
| General definition of EPA command set: The # sign denotes bit values defined in EPA, some of these bit values will be addresses-labeled With 'X' for address, others may be predefined for the command. | 1[EPA] #### |  |
| Assign Address: This command is issued to assign an address to an EPA compliant device. The Address field is denoted with 'X' - up to 4 bits of addresses which includes an address field as part of the bracketed [ ] EPA commands. The value of these addresses are user definable. | 1[110] XXXX Repeated assign address | High Low |
| Assign Address to Restricted Address (RA) devices (top 4 addresses): If an RA type device is found, it (or they) must be place at the end of the physical daisy chain link, but before a non-EPA (legacy) device. | 1[110] 11XX | High |
| Select Address: This command is used to access the EPA addressed device. This command must be issued before any standard IEEE 1284 negotiation requests can be accepted by the EPA compliant device. | 1[100] XXXX | High |
| Lock Address: This command is used to access the EPA addressed device. This command must be issued before any standard IEEE 1284 negotiation requests can be accepted by the EPA compliant device. | 1[010] XXXX | High |
| Un-Address Device: This command removes the addressed state of the device responding High. All addressed devices are removed. The Assign Address command may then be used to reestablish their addresses, thus allowing a hot swap system. A High response would occur if the device being Un-Addressed was previously address, otherwise the response is Low. | 1[111] 0000 | High/Low |
| Undefined. | 1[101] XXXX 1[011] XXXX 1[001] XXXX | Low |
| Undefined: May or may not be related to EPA. | 1[111] 0001 to 1[111] 1111 | Low |

TABLE 2-continued

| EPA Command Definition | Valid Bit Values (7654 3210) | Xflag Affirmative Response |
|---|---|---|
| Non EPA: Reserved for Extensibility Link Request. | 1[000] 0000 | EPA devices respond Low |

What is claimed is:

1. A method for logically connecting a plurality of devices to a parallel port of a host computer, said method comprising the steps of:

said host computer negotiating with said plurality of devices to assign a unique address to each of said plurality of devices:

said each of said plurality of devices receiving and storing said unique address:

said host computer issuing a first command to enable one of said plurality of devices, said first command containing an address that is assigned to said one of said plurality of devices;

accepting said first command by said one of said plurality of devices;

creating a logical connection over said parallel port between said host and said one plurality of devices; and upon issuing a second command from said one of said plurality of devices, establishing a logical connection over said parallel port between a second of said plurality of devices and said one of said plurality of devices.

2. The method of claim 1 further comprising the step of said host computer terminating said logical connection when said host computer has completed its need to communicate with said one of said plurality of devices.

3. The method of claim 2 wherein:

said step of issuing a first select command being a select address command; and said step of terminating be initiated when a first signal in said parallel port is activated.

4. The method of claim 2 wherein:

said step of issuing a first command being a lock address command; and said step of terminating be initiated when a second signal in said parallel port is activated.

5. An EPA device for logically connecting a device to a parallel port of a host computer, said EPA device comprising:

a first port connected to said host computer;

a second port connected to said device;

a third port; and a controller means for sending and receiving commands, said controller means monitoring said first port for an assign command from said host computer, in response to receiving said assign command, said controller means sends an acknowledge to said host computer, in response to receiving an access EPA port command from said host computer, said controller means connects said first port to said second port, in response to receiving a termination signal from said host computer, said controller means breaks said connection between said first port and said second port and connects said first port to said third port, in response to said controller means sending a master command said controller means connects said second port to said third port.

6. The EPA device as claimed in claim 5 wherein:

said EPA port command is a select address command; and said termination signal is a first signal in said parallel port.

7. The EPA device as claimed in claim 6 wherein said first signal is a "nSelectIn" signal.

8. The EPA device as claimed in claim 5 wherein:

said EPA port command is a lock address command; and said termination signal is a second signal in said parallel port.

9. The EPA device as claimed in claim 8 wherein said first signal is a "nInit" signal.

10. The EPA device as claimed in claim 5 wherein said EPA device is integrated into said device.

11. The EPA device as claimed in claim 5 further comprising a second EPA device connected to said third port.

12. A method for logically connecting a host computer to a device over a parallel port, said method comprising the steps of:

said host computer negotiating with said device to assign a unique address to said device:

said device receiving and storing said unique address:

said host computer issuing an enable command to said device, said enable command containing an address;

said device accepting said enable command and creating a logical connection over said parallel port between said host computer and said device;

receiving a termination signal from said host computer, said device breaks said logical connection between said host computer and said device and creates a logical connection between said host computer and a downstream device; and upon issuing a master command to said host computer, said device establishing a logical connection over said parallel port between said downstream device and said device.

13. The method as claimed in claim 12 further comprising the steps of:

said device monitoring said parallel port for an assign address command;

said device disabling said logical connection between said host computer and said downstream device in response to detecting said assign address command if said device has an unassigned address;

said device acknowledging to said host computer successful receipt of said assign address command;

said device waiting for said host computer to complete said assign address command; and said device in response to said host computer completing said assign address command, storing said unique address and enabling said logical connection between said host computer and said downstream device.

14. The method as claimed in claim 12 wherein said step of accepting further comprising the steps of:

said device monitoring said parallel port for said enable command;

said device verifying that said unique address assigned to said device is the same as said address in said enable command;

said device disabling said logical connection between said host computer and said downstream device in response to detecting and verifying said enable command;

said device acknowledging to said host computer successful receipt of said enable command; and said device creating said logical connection between said host computer and said downstream device.

15. The method as claimed in claim 12 wherein:

said enable command is a select address command; and said termination signal is a first signal in said parallel port.

16. The method as claimed in claim 12 wherein:

said enable command is a lock address command; and said termination signal is a second signal in said parallel port.

\* \* \* \* \*